(12) United States Patent
Juestel et al.

(10) Patent No.: US 7,884,535 B2
(45) Date of Patent: Feb. 8, 2011

(54) LOW-PRESSURE GAS DISCHARGE LAMP COMPRISING A UV-B PHOSPHOR

(75) Inventors: Thomas Juestel, Witten (DE); Walter Mayr, Alsdorf (DE); Olaf Mastenbroek, Goes (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 710 days.

(21) Appl. No.: 11/570,346

(22) PCT Filed: Jun. 10, 2005

(86) PCT No.: PCT/IB2005/051918
§ 371 (c)(1), (2), (4) Date: Dec. 11, 2006

(87) PCT Pub. No.: WO2005/124825
PCT Pub. Date: Dec. 29, 2005

(65) Prior Publication Data
US 2007/0247052 A1   Oct. 25, 2007

(30) Foreign Application Priority Data
Jun. 14, 2004   (EP) .................................. 04102698

(51) Int. Cl.
*H01J 1/62* (2006.01)
*H01J 63/04* (2006.01)
(52) U.S. Cl. ........................ 313/486; 313/484; 313/485; 313/637; 313/638; 313/639; 252/301.4 R; 252/301.4 P; 607/88; 607/94

(58) Field of Classification Search ......... 313/484–487, 313/637–640; 252/301.4 R, 301.4 P; 607/88, 607/94
See application file for complete search history.

(56) References Cited

U.S. PATENT DOCUMENTS

| | | | |
|---|---|---|---|
| 5,552,082 A | 9/1996 | Srivastava et al. | |
| 5,944,748 A | 8/1999 | Mager et al. | |
| 6,210,605 B1 | 4/2001 | Srivastava et al. | |
| 6,982,046 B2 * | 1/2006 | Srivastava et al. | 252/301.4 R |
| 7,241,306 B2 * | 7/2007 | Minamoto et al. | 607/94 |
| 2001/0024088 A1 * | 9/2001 | Justel et al. | 313/587 |
| 2002/0041145 A1 | 4/2002 | Yokosawa et al. | |
| 2003/0004501 A1 | 1/2003 | Wilkens et al. | |
| 2003/0011310 A1 | 1/2003 | Juestel et al. | |

FOREIGN PATENT DOCUMENTS

| | | |
|---|---|---|
| EP | 1253624 A2 | 10/2002 |
| GB | 1536637 | 12/1978 |
| JP | 2001172624 A * | 6/2001 |
| WO | 2005124825 A2 | 12/2005 |

* cited by examiner

*Primary Examiner*—Nimeshkumar D Patel
*Assistant Examiner*—Thomas A Hollweg

(57) ABSTRACT

A low-pressure gas discharge lamp includes a gas discharge vessel having a gas filling with a discharge-maintaining composition. At least part of a wall of the discharge vessel is provided with a luminescent material including a first UV-B phosphor containing, in a host lattice, gadolinium(III) as an activator and praseodymium(III) as a sensitizer.

11 Claims, 4 Drawing Sheets

LOW-PRESSURE GAS DISCHARGE LAMP COMPRISING A UV-B PHOSPHOR

The invention relates to a low-pressure gas discharge lamp comprising a light-transmitting discharge vessel, said discharge vessel enclosing, in a gastight manner, a discharge space provided with a gas filling comprising at least one discharge-maintaining component in a discharge-maintaining composition. At least part of a wall of the discharge vessel is provided with at least one layer of a luminescent material comprising a UV-B phosphor for converting the UV-radiation generated by the discharge into UV-B radiation. The portion of UV radiation in the medium wavelength range of 300 nm to 320 nm is referred to as UV-B radiation. UV-B radiation is useful for e.g. medical, cosmetic or germicidal purposes.

The low-pressure gas discharge lamp also comprises discharge means for igniting and maintaining an electric discharge in the discharge vessel.

The invention particularly relates to a low-pressure gas discharge lamp comprising a particular type of luminescent material to emit narrow-band UV-B radiation which is useful for UV-B phototherapy.

UV-B phototherapy, using UV-B radiation, consists of exposing the skin to UV-B radiation. It has been found to be very effective in the treatment of certain skin diseases, such as psoriasis, vitiligo, eczema and other skin disorders.

To improve the therapeutic effect of UV-B radiation, most fluorescent lamps available for phototherapy of the human skin are designed to have a narrow-band UV-B spectrum and therefore emit predominantly narrow-band UV-B radiation in the range of 310 nm to 313 nm. It has been demonstrated that radiation having a wavelength in this part of the UV spectrum is especially effective for treatment of psoriasis. Furthermore, the part of UV radiation that causes sunburn is absent in the narrow-band UV-B spectrum. The treatment of patients can thus be prolonged without causing sunburn.

The most suitable luminescent material for generating narrow-band UV-B light in phototherapy lamps comprises $LaB_3O_6$:Bi,Gd as a UV-B-phosphor, known from GB 1 536 637, with a high efficiency at 185 nm and 254 nm excitation. It has a maximum emission peak at about 310 nm to 313 nm and a half-value width of less than 10 nm.

Similarly as with any high-output phosphor-based device, the narrow-band UV-B lamp comprising $LaB_3O_6$:Bi,Gd as a UV-B phosphor is susceptible to phosphor degradation due to short-wave UV radiation. Static high-intensity operation, as used for UV-B phototherapy, is fatal to phosphors, resulting in a reduction of the electro-optical efficiency in the course of their service life.

Moreover, in low-pressure gas discharge lamps, in which the gas filling comprises mercury, a recombination of mercury ions and electrons on the phosphor surface or the incidence of excited mercury atoms and electrons on the phosphor layer also cause the emissivity of the phosphors to decrease in the course of time.

A widely applied method of reducing the UV light output decrease is the addition of a protective layer of nanoparticles of $Al_2O_3$ (alon-c), wherein 1% to 8% alon-c is added to the luminescent material.

A much better approach would be the replacement of $LaB_3O_6$:Bi,Gd by a narrow-band UV-B phosphor, which is less prone to degradation.

Accordingly, it is the object of the invention to provide a low-pressure gas discharge lamp, particularly for phototherapy purposes, which has a higher UV-B output, a longer lifetime and an improved lumen maintenance.

According to the invention, this object is achieved by a low-pressure gas discharge lamp provided with a gas discharge vessel comprising a gas filling with a discharge-maintaining composition, wherein at least part of a wall of the discharge vessel is provided with a luminescent material comprising a first UV-B phosphor containing, in a host lattice, gadolinium(III) as an activator and praseodymium(III) as a sensitizer, which low-pressure gas discharge lamp is further provided with means for generating and maintaining a low-pressure gas discharge.

The invention is based on the recognition that bismuth used as a sensitizer in the host lattice of $LaB_3O_6$:Bi,Gd tends to react with impurities or defects in the host's crystalline structure, which rapidly decreases the light output of UV-B lamps when used for long periods of time.

Praseodymium is much less sensitive to crystalline defects and redox-reactions. Due to the high photochemical stability of the luminescent material, the lamps according to the invention are useful in all fields of application of UV-B radiation, wherein photo degradation or thermal quenching of the phosphor limits the device performance, e.g. in highly loaded fluorescent lamps.

In accordance with a preferred embodiment of the invention, the low-pressure gas discharge lamp comprises mercury in the discharge-maintaining composition. A low-pressure gas discharge lamp according to the invention, provided with a luminescent material comprising a first UV-B phosphor containing, in a host lattice, gadolinium(III) as an activator and praseodymium(III) as a sensitizer, appears to be very well resistant to the action of the mercury rare gas atmosphere which, in operation, prevails in the discharge vessel of the low-pressure mercury vapor discharge lamp. As a result, blackening due to interaction between mercury and the UV-B phosphor is reduced, resulting in an improvement of the maintenance. During the service life of the discharge lamp, a smaller quantity of mercury is withdrawn from the discharge, so that, in addition, the mercury consumption of the discharge lamp is reduced and a smaller mercury dose will suffice in the manufacture of the low-pressure mercury vapor discharge lamp.

It may also be preferred that the luminescent material also comprises a second UV-B phosphor to adjust the lamp spectrum. Such a UV-B phosphor may be selected from the group of $SrAl_{12}O_{19}$:Ce, $(La_{1-x}Gd_x)PO_4$:Ce, or a mixture thereof.

It may also be preferred that the luminescent material further comprises an additive selected from the group of $Al_2O_3$, MgO, $MgAl_2O_4$ and $Y_2O_3$ to reduce mercury deposition on the phosphors and the glass walls of the discharge vessel.

The low-pressure gas discharge lamp according to the invention may be preferably used for medical purposes, but also for cosmetic and germicidal purposes as well as photochemical processes.

In accordance with a second aspect of the invention, a UV-B phosphor containing, in a host lattice, gadolinium(III) as an activator and praseodymium(III) as a sensitizer, is provided.

A UV-B phosphor containing, in a host lattice, gadolinium(III) as an activator and praseodymium(III) as a sensitizer, is a very bright crystalline phosphor, i.e. this UV-B radiation-emitting phosphor combines a very good absorption in the VUV range and a very high emission quantum yield above 80%. Unlike other UV-B phosphors, it is hardly degraded by the VUV radiation. It has a longer lifespan and an improved luminance in spite of the fact that it does not contain bismuth.

This UV-B phosphor has the advantage that the photoluminescing phenomenon takes place at the atomic level, rather than at the molecular level. Consequently, the luminescence is not degraded by molecular bond breakage over time and exposure to energetic ultraviolet rays. UV-B phosphors formed according to the invention thus have a long lifetime.

Particularly advantageous effects of the invention in relation to the state of the art are obtained with a UV-B phosphor containing, in a host lattice, gadolinium(III) as an activator and praseodymium as a sensitizer, when the host lattice is selected from the compounds of an oxo-anion with a cationic metal species, selected from yttrium(III) and lutetium (III). Such oxo-anions may be selected from the group of borates, aluminates, gallates, silicates, germanates, phosphates, arsenate, vanadate and mixtures thereof.

The host lattice may additionally comprise a cation selected from the group of calcium, strontium and barium.

The UV-B phosphor preferably comprises the activator in an amount of 0.001 mol % to 20 mol % relative to the cation in the host lattice and the sensitizer in an amount of 0.001 mol % to 2 mol % relative to the cation in the host lattice.

Particularly useful materials are $(Y_{1-x-a-b}Lu_x)BO_3:Pr_aGd_b$, wherein $0.001 \leq a \leq 0.02$; $0.001 \leq b \leq 0.02$ and $0.001 \leq x \leq 0.01$; $(Y_{1-x}Lu_x)Al_3(BO_3)_4:Pr_aGd_b$, wherein $0.001 \leq a \leq 0.02$; $0.001 \leq b \leq 0.02$ and $0.001 \leq x \leq 0.01$ and $(Ba_{1-x-y}Sr_xCa_y)(Y_{1-a-b-c}Lu_c)B_9O_{16}:Pr_aGd_b$, wherein $0.001 \leq a \leq 0.02$; $0.001 \leq b \leq 0.02$ and $0.001 \leq x \leq 0.01$.

In accordance with a preferred embodiment of the invention, the UV-B phosphor has a grain size of 10 nm<d<500 nm.

A phosphor layer containing a UV-A phosphor having a grain size in the nano-range forms a very dense layer which satisfactorily shields the phosphor from the mercury plasma. In addition, this very dense layer causes the recombination of mercury ions and electrons on the surface of the phosphor layer to be reduced.

These and other aspects of the invention are apparent from and will be elucidated with reference to the embodiments described hereinafter.

DETAILED DESCRIPTION

One aspect of the invention focuses on a Uv-B phosphor comprising a host lattice, the host lattice containing gadolinium(III) as an activator and praseodymium(III) as a sensitizer in any configuration of a low-pressure gas discharge lamp.

The UV-B phosphor according to the invention or the luminescent material comprising such a phosphor absorbs the radiation emitted by the low-pressure mercury discharge and converts said radiation into radiation with a longer wavelength. By suitable choice of the UV-B radiation-emitting phosphors, the light emitted by the low-pressure gas discharge lamp can be given any desired wavelength in the range of 310 nm to 320 nm.

While the use of the present phosphor is contemplated for a wide array of illuminations, particularly for cosmetic, medical and germicidal purposes, such as sterilization at waterworks and sewage-treatment plants, sterilization of various types of gases and liquids as well as photochemical processing for production, processing, and treatment of products, such as lacquers, the invention is described with particular reference to, and finds particular application in, low-pressure gas discharge lamps for phototherapy purposes, for which a spectrum with a higher amount of UV-B emission is needed.

Typically, a UV-B lamp is a low-pressure mercury vapor discharge lamp, but other types of lamps may be useful. Electrodeless dielectric barrier lamps are particularly contemplated.

FIG. 1 shows a low-pressure mercury vapor discharge lamp in accordance with one embodiment of the invention.

The lighting principle of this UV-B lamp is completely the same as that of other known fluorescent lamps. The UV-B lamp is only different from the typical fluorescent lamp in that it does use a UV-B phosphor film and its bulb is made of glass having a satisfactory ultraviolet radiation transmittance, or fused quartz. In such an ultraviolet radiation lamp, excited mercury atoms emit far ultraviolet rays, which are converted into UV-B radiation by the UV-B phosphor.

FIG. 1 illustrates a low-pressure mercury vapor discharge lamp 1 with an elongated lamp vessel, or bulb, 3. The bulb is made of 290 glass. The lamp includes an electrode mount structure 5 at each end, with a coiled tungsten filament 6 supported on conductive feed-throughs 7 and 9 extending through a glass press seal 11 in a mount stem 10. The mount stem is made of a conventional lead-containing glass. The stem 10 seals the envelope in a gas-tight manner. The leads 7, 9 are connected to the pin-shaped contacts 13 of their respective bases 12 fixed at opposite ends of the lamp.

The discharge-sustaining gas filling includes an inert gas such as argon, or a mixture of argon and other gases, at a low pressure in combination with a small quantity of mercury to sustain an arc discharge during lamp operation.

Optionally, the inner surface 15 of the outer envelope 3 is provided with a mercury-protective layer or undercoat 16. The layer 16 may be provided to reduce the rate of mercury depletion caused by reactions with the glass of the envelope. Both coatings extend throughout the length of the bulb, completely circumferentially around the bulb inner wall. The stems 10 are free from any of the above coatings.

In the embodiment of the invention shown in FIG. 1, the inside of the glass tube is provided with a first phosphor layer 17. Said first phosphor layer 17 contains a UV-B phosphor according to the invention or a luminescent material comprising a UV-B phosphor according to the invention.

Different luminescent materials having a different ultraviolet spectral energy distribution are easily obtained by mixing a UV-B phosphor according to the invention with a known fluorescent material generating different radiation intensities to provide coatings which produce the desired spectrum.

In particular, $SrAl_{12}O_{19}:Ce$ and $(La_{1-x}Gd_x)PO_4:Ce$ are well-known fluorescent phosphor materials for producing UV-B radiation, as is $SrB_4O_7:Eu$, or $LaMgAl_{11}O_{19}:Ce$ for producing UV-A radiation.

These well-known UV-producing fluorescent phosphor materials may be mixed in different proportions to produce the desired UV radiation ratio and intensity, and thus predetermined phototherapy strengths.

Alternatively, the phosphor coating may consist of a double phosphor layer on the inner wall of the gas discharge vessel, which phosphor layers contains the UV-B phosphor according to the invention in one layer and a second UV-B phosphor in a second layer.

If an AC voltage is applied to the electrodes, an electric gas discharge can be ignited in the gas filling containing mercury and argon. As a result, a plasma is formed comprising gas atoms or molecules that are excited or ionized. When the atoms return to the ground state, as occurs when electrons and ions are recombined, a more or less substantial part of the potential energy is converted into UV radiation having wavelengths of 104 nm (Ar), 106 nm (Ar), 185 nm (Hg), 254 nm (Hg), and into visible radiation.

This conversion of electron energy into UV radiation takes place very efficiently in the mercury low-pressure gas discharge.

The generated VUV photons having a wavelength of 104 nm (Ar), 106 nm (Ar) and 185 nm (Hg) are absorbed by the UV-B phosphor and the excitation energy is released again in the longer UV-B wavelength range of the spectrum as narrow band UV-B radiation.

In accordance with a second aspect of the invention, a luminescent material according to the invention comprises a UV-B-emitting phosphor.

This class of phosphor materials is based on activated luminescence of a host lattice material doped with a few percents of gadolinium(III) as an activator and a few percents of praseodymium as a sensitizer. The UV-B phosphor preferably comprises the activator in an amount of 0.001 mol % to 20 mol % relative to the cation in the host lattice and the sensitizer in an amount of 0.001 mol % to 2 mol % relative to the cation in the host lattice.

Typically, the host material has a host lattice with an inorganic, ionic lattice structure in which the dopant ion replaces a lattice ion. The sensitizer absorbs the incident energy, photon or excited electron from the discharge of the discharge-maintaining composition, and the activator forms the site where the electron relaxes radiatively.

Gadolinium is an excellent activator, because both its ground state and excited states lie within the band gap of about 6 eV of the host lattice.

Gadolinium absorbs and emits radiation via 4f-5df transitions, i.e. electronic transitions involving f-orbital energy levels. While f-f transitions are quantum-mechanically forbidden, resulting in weak emission intensities, it is known that certain rare-earth ions, such as Gd(III), strongly absorb radiation through allowed 4f-5df transitions (via d-orbital/f-orbital mixing) and consequently produce high emission intensities in the UV-B range of the electromagnetic spectrum.

Yet, sensitisation of Gd(III)-activated luminescent materials is necessary, because this activator does not have any charge transfer or 4f5d states up to 70000 cm$^{-1}$ above the $^8$S ground state level of the 4f$^7$ configuration. For this reason, it cannot absorb the 185 nm and 254 nm from the Hg low-pressure discharge. The chemically stable Pr$^{3+}$ is a suitable sensitizer for this purpose. It can be used as a sensitizer due to the energetic position of the 4f$^1$5d$^1$ configuration above the ground state ($^3$H$_4$) of the 4f$^2$ configuration. The energy gap between these two states is 62000 cm$^{-1}$ for the free Pr$^{3+}$ ion, which corresponds to 160 nm. This energy gap is reduced in a crystalline environment due the nephelauxetic effect (covalency) and the crystal field splitting of the 5d orbital.

Thus, this aspect of the invention is partly based on the discovery that gadolinium is efficiently sensitized by praseodymium when incorporated into an appropriate host material. The host lattice influences the exact position of the energy level of the activator ion and hence the emission spectrum.

According to the invention, host lattices are chosen, in which the lowest crystal field component of the 4f$^1$5d$^1$ configuration is located at about 40000 cm$^{-1}$ above the ground state $^3$H$_4$ to obtain a UV-B phosphor, which efficiently absorbs the 254 nm radiation from the Hg low-pressure discharge. The reduction of energy of the lowest crystal field component of the 4f$^1$5d$^1$ configuration must not be too large, because then the absorbed energy on Pr$^{3+}$ cannot be transferred anymore to those Gd$^{3+}$ levels (6P$_J$), from which emission is desired.

An appropriate reduction of the energy of the lowest 4f$^1$5d$^1$ component is achieved in a host lattice, being an inorganic oxygen-containing material comprising oxo-anions together with cationic metal species.

Oxo-anions are generally defined as oxygen-containing species having a net negative ionic charge. Host lattices comprising oxo-anions have the following properties. They have a large band gap so as not to absorb the emitted radiation from the activator. They are relatively stiff, so that lattice vibrations, which lead to non-radiative relaxation decreasing the efficiency, are not easily excited.

The oxo-anions of boron, aluminum, gallium, silicon germanium, phosphor, arsenic, vanadium and combinations or mixtures thereof are of particular interest.

Typically, these oxo-anions are comprised of individual monomer sub-units $[A^{a+}O_xO_{y/2}]^{a-2x-y}$, wherein A is boron, aluminum, gallium, silicon germanium, phosphor, arsenic, vanadium, a is their respective oxidation number, O is oxygen and x+y is an integer equal to 3 or 4.

The sub-units may be bound together by conventional covalent oxygen-bridge bonds (i.e. shared electrons).

Oxo-anions are either isolated (finite), or oligomere, i.e. connected to a limited number of adjacent oxo-anions by oxygen bridges or, alternatively, directly interconnected through oxygen bonding into infinite chains, sheets or 3-dimensional framework structures.

The oxo-anions are preferably oligomere boron oxo-anions. Oligomere borate compounds made up of isolated boron oxo-anions containing one to six boron atoms are preferred. Similarly, borate compounds containing infinite chains, sheets and 3-dimensional framework structures made up of repeating boron oxo-anions (fundamental building blocks) having more than six boron atoms may be used.

Useful boron oxo-anions are metaborates, triborates, tetraborates, pentaborates, hexaborates and nonaborates.

Structurally, each of these borate oxo-anions has a different form. For example, the metaborate anion has a tetrahedral form, while the tetraborate anion is a bridged eight-member B—O ring, the triborate anion is a six-member B—O ring (referred to as a boroxyl ring), the pentaborate anion consists of two six-member B—O rings sharing a common boron atom and the hexaborate anion consists of three B—O rings sharing three boron atoms and one oxygen atom.

The oxo-anion may contain a single oxo-anion species, a mixture of different oxo-anions or a combination of more than one element selected from boron, aluminum, gallium, silicon germanium, phosphor, arsenic, vanadium in one oxo-anionic species.

By way of example, such combinations may comprise borosilicate, phosphosilicate, aluminosilicate, and aluminoborate.

In the host lattice of the UV-B phosphors according to the invention, the oxo-anions are used with specific counter-ions, i.e. cationic metal species, selected from ytterbium and lutetium.

Furthermore, alkaline earth metals EA may optionally be included. Metals EA are, for example, calcium, strontium and barium.

Yttrium, lutetium and EA may be present as one metal or a mixture of two or more metals. The metal atoms are co-ordinated to oxygen atoms in the compounds.

Particularly useful materials of the UV-B phosphor according to the invention are $(Y_{1-x-a-b}Lu_x)BO_3:Pr_aGd_b$, wherein $0.001 \leq a \leq 0.02$; $0.001 \leq b \leq 0.02$ and $0.001 \leq x \leq 0.01$; $(Y_{1-x}Lu_x)Al_3(BO_3)_4:Pr_aGd_b$, wherein $0.001 \leq a \leq 0.02$; $0.001 \leq b \leq 0.02$ and $0.001 \leq x \leq 0.01$ and $(Ba_{1-x-y}Sr_xCa_y)(Y_{1-a-b-c}Lu_c)B_9O_{16}:Pr_aGd_b$, wherein $0.001 \leq a \leq 0.02$; $0.001 \leq b \leq 0.02$ and $0.001 \leq x \leq 0.01$.

The type and amount of yttrium, lutetium and EA present in the compound can dictate the physical and/or chemical properties of the compound, while the local bonding environments of gadolinium and praseodymium in the oxo-anion host lattice determine the characteristics of their emission and absorption spectra.

Oxo-anionic compounds of yttrium and lutetium are useful hosts for gadolinium and praseodymium, because the oxygen atoms surrounding gadolinium and praseodymium have a substantial impact on their emission and absorption spectra. The limited electro-negativity of the oxo-anions decreases the degeneracy of the electronic states of gadolinium and praseodymium, producing emission and absorption bands which differ substantially from those produced in e.g. halide hosts: they are narrower and have different relative intensities and, sometimes, different positions. In general, the absolute position and width of an emission or absorption band shifts to a lower energy as the electro-negativity of the surrounding anions decreases, as is shown for praseodymium in FIG. 2.

The emission spectra of the UV-B phosphor containing gadolinium as an activator and praseodymium as a sensitizer resemble that of the UV-B phosphor containing gadolinium as an activator and bismuth as a sensitizer. It exhibits a narrow emission band at 311 nm due to the 4f-4f transitions of Gd(III).

These UV-B phosphors are preferably used in a grain size distribution in the nano-range and an average grain size of 10 nm to 500 nm.

The grain size is determined by the properties of the phosphor to absorb UV radiation and absorb as well as scatter visible radiation, but also by the necessity to form a phosphor coating that bonds well to the glass wall. The latter requirement is met only by very small grains, the light output of which is, however, smaller than that of slightly larger grains.

The phosphors are customarily manufactured by means of a solid-state reaction of the starting compounds in the form of fine-grain powders having a grain size distribution between 0.5 μm and 1 μm.

To apply the phosphors to the walls of the gas discharge vessel, use is customarily made of a flooding process. The coating suspensions for the flooding process contain water or an organic compound such as butyl acetate as a solvent. The suspension is stabilized by adding auxiliary agents, for example, cellulose derivatives, polymethacrylic acid or polypropylene oxide, and is influenced in its Theological properties. Customarily, use is made of further additives such as dispersing agents, defoaming agents and powder conditioning agents, such as aluminum oxide, aluminum oxynitride or boric acid. The phosphor suspension is provided as a thin layer on the inside of the gas discharge vessel by pouring, flushing or spraying. The coating is subsequently dried by means of hot air and burnt in at approximately 600° C. The layers generally have a thickness in the range of 1 μm to 50 μm.

Specific Example 1 a. Synthesis of $YBO_3$:1% Pr, 20% Gd

To manufacture the UV-B phosphor $YBO_3$:1% Pr, 20% Gd, the starting materials 2.175 g (6.0 mmol) $Gd_2O_3$, 5.532 g (23.70 mmol) $Y_2O_3$, and 0.261 g (0.6 mmol) $Pr(NO_3)_3$.6($H_2O$) were suspended in dematerialized water. The suspension was treated by ultrasound for 10 minutes. Subsequently, 8.162 g (132.00 mmol) $H_3BO_3$ was added under intense stirring. Thereafter, the solvent was removed by distillation. The remaining powder was dried at 100° C., milled, and subsequently annealed at 900° C. for 1 h in a CO-atmosphere. After a thorough grinding step, the powder was twice annealed at 1100° C. for 4 h in a CO-atmosphere in an intermittent grinding step. Finally, the powder was milled again, washed in 650 ml of water at 60° C. for several hours, and dried at 100° C. Said $YBO_3$:1% Pr, 20% Gd is crystalline and has an average grain size of 3 micrometers.

FIG. 3 shows the emission and excitation spectrum of $YBO_3$:1% Pr, 20% Gd.

b. UV-B Lamp Comprising $YBO_3$:1% Pr, 20% Gd

A butyl acetate-based phosphor suspension comprising $YBO_3$:1% Pr, 20% Gd and 1% alon-c was made and sieved through a 36 μm mesh. In a flow coat-related procedure, the suspension was applied to the inner wall of a 290 glass tube. The viscosity of the suspension was adjusted in such a way that the resulting phosphor layer had a screen weight of between 0.5 mg/cm$^2$ and 3.0 mg/cm$^2$.

After the coating processes, organic residues (binder, etc.) were removed in an annealing step at 550° C. to 600° C. The lamp was subsequently filled with a few millibar of Argon and with 1 to 50 mg of Hg. Finally, electrodes were attached to the lamp and the tube was sealed.

The emission spectrum of a mercury low-pressure discharge lamp comprising $YBO_3$:Pr,Gd as a UV-B phosphor is shown in FIG. 4

Specific Example 2 a. Synthesis of $YAl_3B_4O_{12}$:1% Pr, 20% Gd

To manufacture the UV-B phosphor $YAl_3B_4O_{12}$:1% Pr, 20% Gd, the starting materials 0.541 g (1.492 mmol) $Gd_2O_3$, 3.0 g (13.29 mmol) $Y_2O_3$, 4.858 g (44.79 mmol) $Al_2O_3$ and 0.130 g (0.299 mmol) $Pr(NO_3)_3$.6($H_2O$) were suspended in dematerialized water. The suspension was treated by ultrasound for 10 minutes. Subsequently, 7.568 g (122.40 mmol) $H_3BO_3$ was added under intense stirring. Thereafter, the solvent was removed by distillation. The remaining powder was dried at 100° C., milled, and subsequently annealed at 900° C. for 1 h in a CO-atmosphere. After a thorough grinding step, the powder was twice annealed at 1100° C. for 4 h in a CO-atmosphere in an intermittent grinding step. Finally, the powder was milled again, washed in 650 ml of water at 60° C. for several hours, and dried at 100° C. Said $YAl_3B_4O_{12}$:1% Pr, 20% Gd is crystalline and has an average grain size of 3 micrometers.

FIG. 5 shows the emission and excitation spectrum of $YAl_3B_4O_{12}$:1% Pr, 20% Gd.

b. UV-B Lamp Comprising $YAl_3B_4O_{12}$:1% Pr, 20% Gd

A butyl acetate-based phosphor suspension comprising $YAl_3B_4O_{12}$:1% Pr, 20% Gd and 1% alon-c was made and sieved through a 36 μm mesh. In a flow coat-related procedure, the suspension was applied to the inner wall of a 290 glass tube. The viscosity of the suspension was adjusted in such a way that the resulting phosphor layer had a screen weight of between 0.5 mg/cm$^2$ and 3.0 mg/cm$^2$.

After the coating processes, organic residues (binder, etc.) were removed in an annealing step at 550° C. to 600° C. The lamp was subsequently filled with a few millibar of Argon and 1 to 50 mg of Hg. Finally, electrodes were attached to the lamp and the tube was sealed.

Those skilled in the art will appreciate from the foregoing description that the broad teachings of the invention can be implemented in a variety of forms. Therefore, while this invention has been described in connection with particular examples thereof, the true scope of the invention should not be limited thereto, because other modifications will be evident to the skilled person after a study of the drawings, specification and claims.

Figure 1:
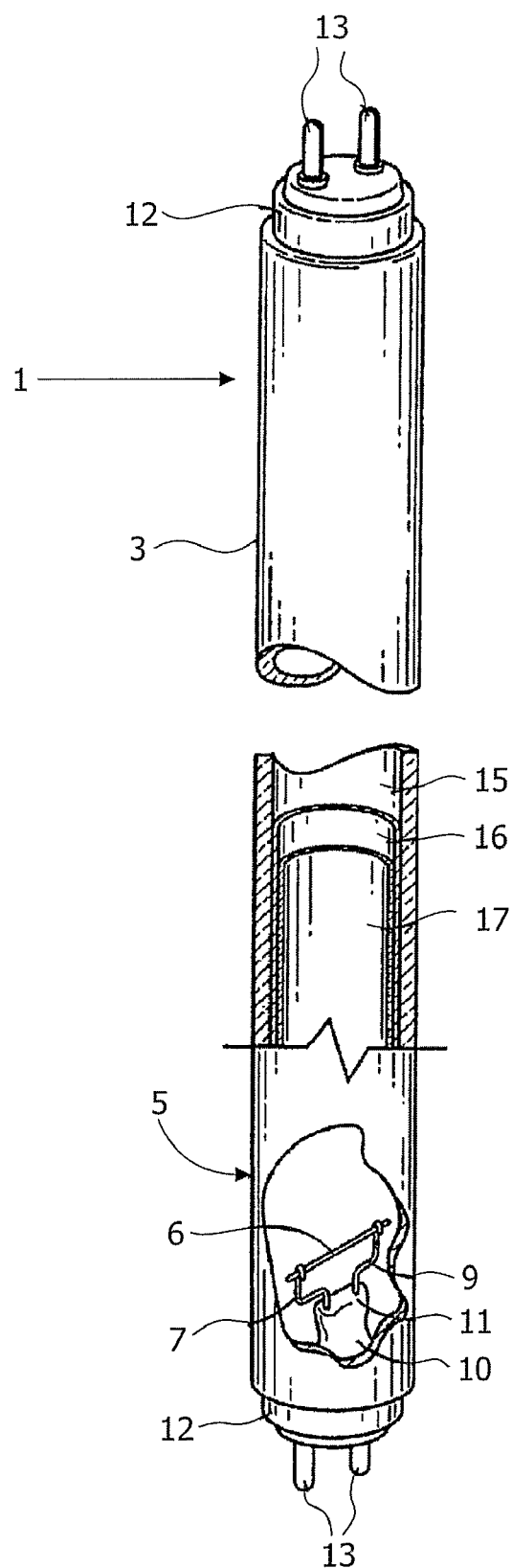
FIG. 1 shows an example of a low-pressure gas discharge lamp with a mercury filling, and two phosphor layers.
Figure 2:
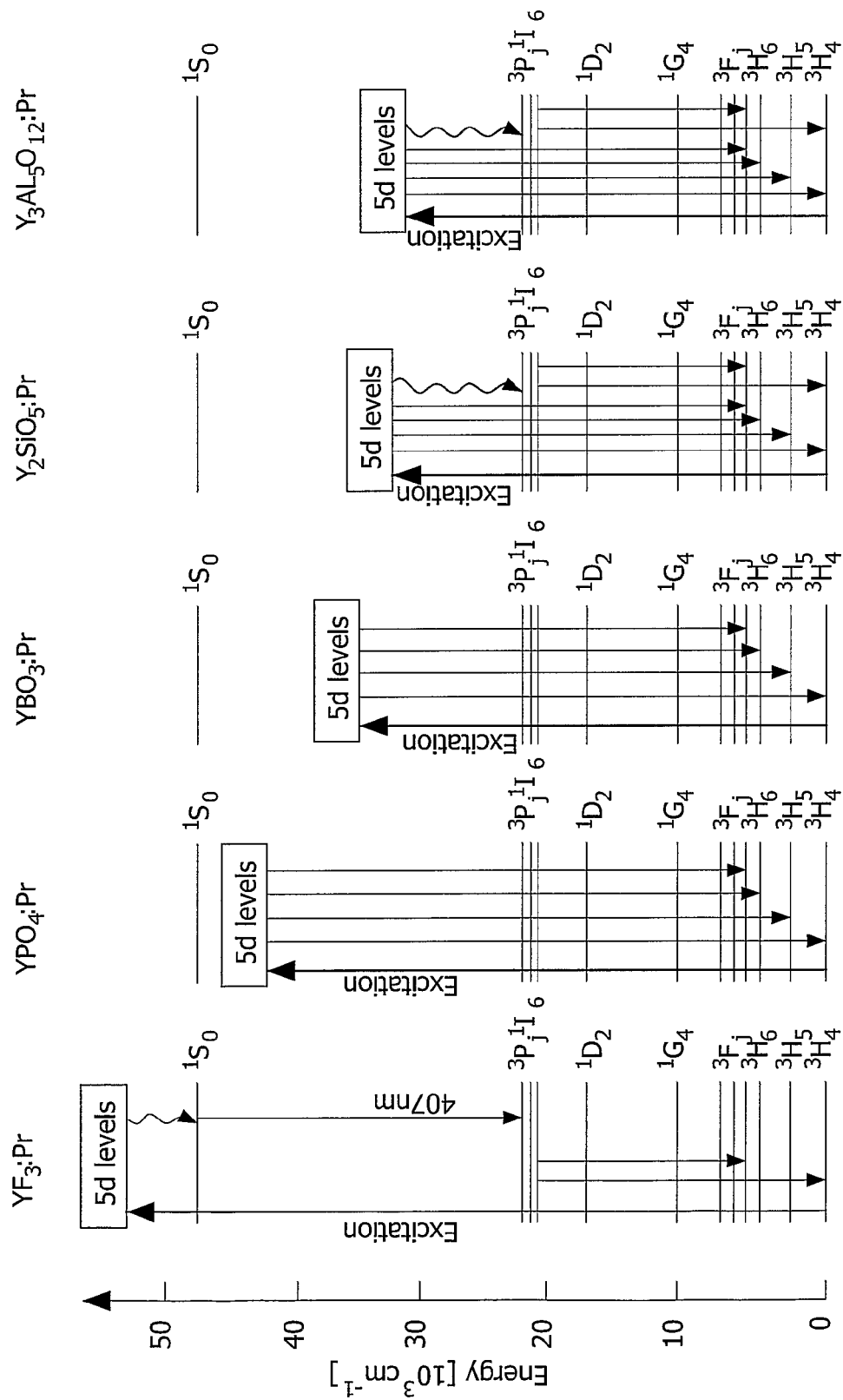
FIG. 2 is a schematic view of quantum spectra of Pr(III) in different host lattices.
Figure 3:
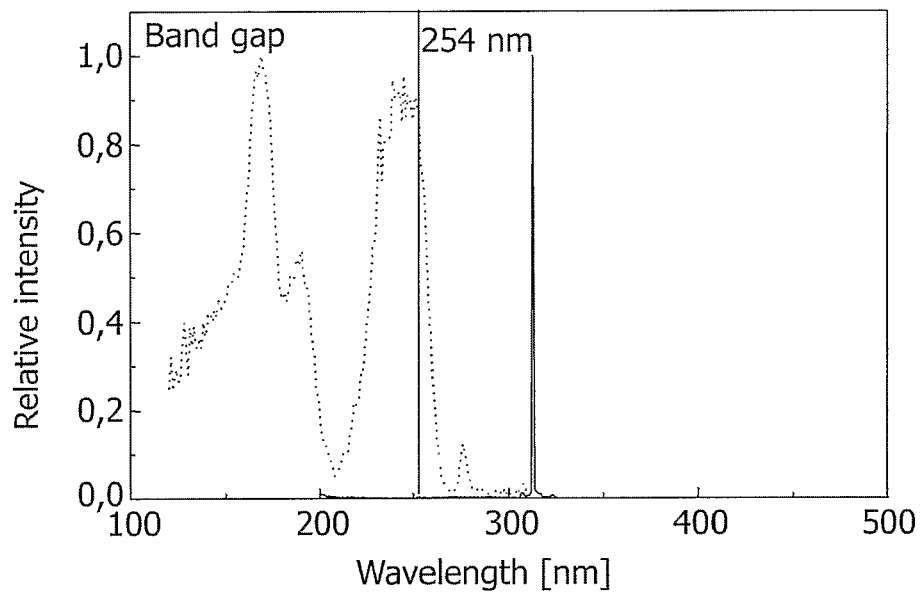
FIG. 3 shows the emission and excitation spectrum of $YBO_3$:1% Pr, 20% Gd.
Figure 4:
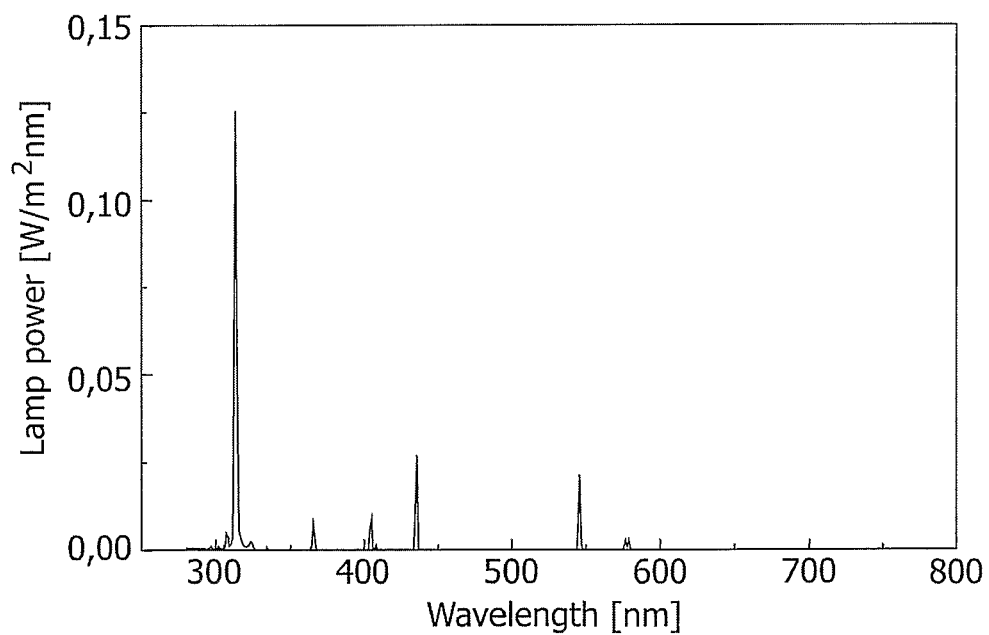
FIG. 4 shows the spectrum of a UV-B lamp comprising $YBO_3$:1% Pr, 20% Gd.
Figure 5:
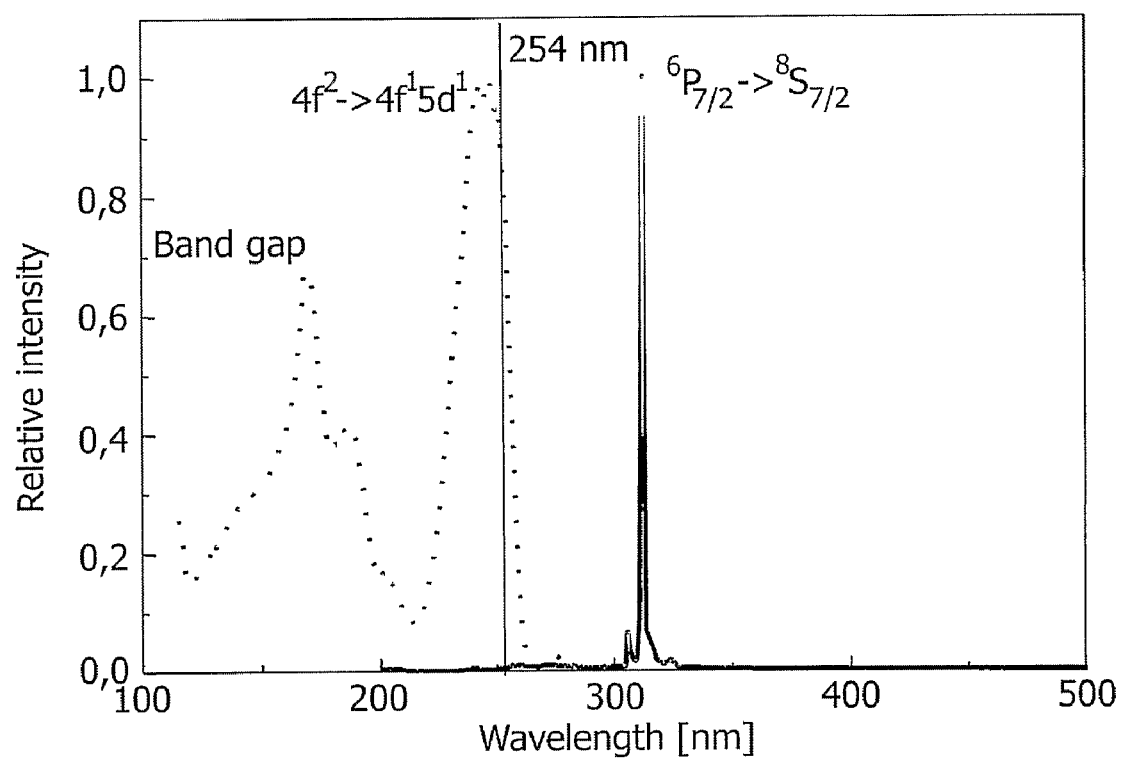
FIG. 5 shows the emission and excitation spectrum of $YAl_3B_4O_{12}$:1% Pr, 20% Gd.

The invention claimed is:

1. A low-pressure gas discharge lamp provided with a gas discharge vessel comprising a gas filling with a discharge-maintaining composition, wherein at least part of a wall of the discharge vessel is provided with a luminescent material comprising a first UV-B phosphor containing, in a host lattice, gadolinium(III) as an activator and praseodymium(III) as a sensitizer, wherein the low-pressure gas discharge lamp is further provided with means for generating and maintaining a low-pressure gas discharge for providing UV-radiation, wherein the first UV-B phosphor converts the UV-radiation into UV-B radiation, and wherein the host lattice is selected from compounds of an oxo-anion with a cationic metal species including lutetium(III), wherein the oxo-anion is selected from the group of gallates, germanates, arsenate, vanadate and mixtures thereof.

2. The low-pressure gas discharge lamp as claimed in claim 1, wherein the discharge-maintaining composition comprises mercury.

3. The low-pressure gas discharge lamp as claimed in claim 1, wherein the luminescent material also comprises a second UV-B phosphor.

4. The low-pressure gas discharge lamp as claimed in claim 3, wherein the second UV-B phosphor includes $SrAl_{12}O_{19}$:Ce.

5. The low-pressure gas discharge lamp as claimed in claim 1, wherein the luminescent material further comprises an additive selected from the group of $Al_2O_3$, MgO, $MgAl_2O_4$ and $Y_2O_3$.

6. Use of the low-pressure gas discharge lamp as claimed in claim 1, for cosmetic, medical and germicidal purposes and for photochemical processes.

7. A UV-B phosphor for converting UV-radiation of less than 300 nm into UV-B radiation in a range of 300 nm to 320 nm, the UV-B phosphor containing, in a host lattice, gadolinium(III) as an activator and praseodymium(III) as a sensitizer, wherein the host lattice is selected from compounds of an oxo-anion with a cationic metal species including lutetium(III), wherein the oxo-anion is selected from the group of gallates, germanates, arsenate, vanadate and mixtures thereof.

8. The UV-B phosphor as claimed in claim 7, wherein the host lattice additionally comprises a cation selected from the group of calcium, strontium and barium.

9. The UV-B phosphor as claimed in claim 8, containing the activator in an amount of 0.001 mol % to 20 mol % relative to the cation in the host lattice.

10. The UV-B phosphor as claimed in claim 8, containing the sensitizer in an amount of 0.001 mol % to 2 mol % relative to the cation in the host lattice.

11. The UV-B phosphor as claimed in claim 8, having a grain size of 10 nm<d<500 nm.

* * * * *